US006457172B1

(12) United States Patent
Carmichael et al.

(10) Patent No.: US 6,457,172 B1
(45) Date of Patent: Sep. 24, 2002

(54) COMPILER FOR SUPPORTING MULTIPLE RUNTIME DATA REPRESENTATIONS

(75) Inventors: Ian Carmichael, Markham; Derek B. Inglis, Toronto, both of (CA); Michael Karasick, Pound Ridge, NY (US); Vincent J. Kruskal, Harrison, NY (US); Harold L. Ossher, South Salem, NY (US); David J. Streeter, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/290,821

(22) Filed: Apr. 13, 1999

(51) Int. Cl.[7] ................................................ G06F 9/45
(52) U.S. Cl. ...................... 717/141; 717/152; 717/153; 717/143
(58) Field of Search ................................ 717/140–147, 717/165, 139–143, 148, 152–154

(56) References Cited

U.S. PATENT DOCUMENTS

| | | | | |
|---|---|---|---|---|
| 5,204,960 A | * | 4/1993 | Smith et al. .................... | 717/7 |
| 5,586,328 A | * | 12/1996 | Caron et al. .................... | 717/5 |
| 5,625,822 A | * | 4/1997 | Brett .............................. | 717/5 |
| 5,734,907 A | * | 3/1998 | Jarossay et al. ................ | 717/8 |
| 5,854,932 A | * | 12/1998 | Mariani et al. ................. | 717/9 |
| 6,067,413 A | * | 5/2000 | Gustafsson et al. ............ | 717/1 |
| 6,182,281 B1 | * | 1/2001 | Nackman et al. .............. | 717/5 |
| 6,219,834 B1 | * | 4/2001 | Soroker et al. ................. | 717/6 |

FOREIGN PATENT DOCUMENTS

| | | | |
|---|---|---|---|
| EP | 0805391A2 0805 | * | 5/1997 |
| GB | 2130406 A | * | 5/1984 |

OTHER PUBLICATIONS

Soroker et al, "Extension Mechanism in Montana," Proceedings of the Eight Conference on Computer Systems and Software Engineering, IEEE 1997, pp. 119–128.*

Dean et al, "Vortex: An Optimizing Compiler for Object–Oriented Languages," Proceedings of the Eleventh annual conf. on OOPSLA '96, ACM 1996, pp. 83–98.*

Heering et al, "Lazy and Incremental Program Generation," ACM Transactions on Programming Languages and Systems, vol. 16, No. 3, May 1994, pp. 1010–1023.*

Earley & Caizergues, "A Method for Incrementally Compiling Languages with Nested Statement Structure," Communication of the ACM, vol. 15, No. 12, Dec. 1972, pp. 1040–1044.*

* cited by examiner

*Primary Examiner*—Tuan Q. Dam
(74) *Attorney, Agent, or Firm*—F. Chau & Associates, LLP

(57) ABSTRACT

A compiler having one or more separate components, each of which contains the source code of the compiler which is responsible for implementing a corresponding data representation. These components are responsible for all of the parts of compilation which depend on the corresponding data representation. In one aspect of the present invention, a compiler comprises: a converter for converting program code to object code; and a data representation implementor for isolating within the compiler information that relates to representation of data at runtime, wherein the converter accesses the data representation implementor to obtain information that is needed for converting any portion of the program code that is dependent on representation of data at runtime.

19 Claims, 4 Drawing Sheets

COMPILER FOR SUPPORTING MULTIPLE RUNTIME DATA REPRESENTATIONS

BACKGROUND

1. Technical Field

The present invention relates generally to compilers for computer programming languages and, more particularly, to a compiler having a separate component for implementing one or more runtime data representations, thereby allowing a user to either modify an existing data representation or implement a new data representation without having to access and/or modify source code for the compiler.

2. Description of Related Art

In general, a compiler is a computer program which is utilized for converting high level language (HLL) text files (source code) to object files (object code). In particular, a compiler will parse the source code determining the linguistic constructs it contains (e.g., statement, procedure), check to determine the source code is legal, and then generate object code (comprising one or more object files). The object code is then processed by a linker, wherein the object files are linked together and assigned to particular blocks of memory to become an executable image in machine language. A compiler may be configured to perform both compiling and linking, in which case the output of the compiler is an executable file.

As is known to those skilled in the art, a compiler for a given programming language has to represent runtime data with data structures that are suitable to support the features of the programming language. Conventionally, compilers for different programming languages (and sometimes the same programming language) are configured to represent runtime data in a different manner. There are a variety of techniques which have been developed for structuring runtime data, and such techniques are well-known by those skilled in the art.

For instance, a compiler for an object-oriented ("O—O") programming language is configured to represent "objects" at runtime with data structures that are appropriate to support the features of the language. The manner in which a compiler represents objects of an O—O programming language at runtime is referred to herein as an "object-model." As is well-known by those skilled in the art, an object may be represented at runtime using a data block comprising: a pointer to a virtual function table for the class to which the object belongs, object data, and additional virtual function table pointers and/or virtual base pointers in the case of multiple and/or virtual inheritance. A virtual function table comprises a sequence of pointers which point to code for executing methods for a given object of a particular class.

Typically, compilers are written to generate one data representation which controls how data is structured at runtime. However, a compiler may be configured to generate different kinds of data representations, even for the same program (e.g., support more than one object-model). For instance, with O—O programming languages, it is desirable for a compiler to support more than one object-model since different object-models have different characteristics; some perform better than others, some offer better release-to-release compatibility, some support different language features, and some are desired for compatibility with other vendors. Similarly, for non-O—O languages that support matrices (or sets, or any other high-level data type), it is desirable for compilers to support more than one data representation since different representations have different characteristics; some perform better in certain applications, there are different space/time tradeoffs (e.g, dense versus sparse representations), and some are compatible with other languages or other vendors.

Conventionally, the code within a compiler that is responsible for implementing the data representation (structuring the runtime data) is deeply intertwined with much of the other source code comprising the compiler (i.e., assumptions about the data representation are embedded in the code for most of the compiler). Consequently, since there is no identifiable separation in a conventional compiler between the code that depends on the data representation and the code that does not depend on the data representation, the process of modifying and/or adding support for a new data representation can require extensive changes to the compiler code, which is a formidable task that is prone to error.

SUMMARY OF THE INVENTION

The present invention is a compiler comprising one or more separate components, each of which contains the source code of the compiler which is responsible for implementing a corresponding data representation. These components are responsible for all of the parts of compilation which depend on the corresponding data representation.

In one aspect of the present invention, a compiler comprises:

a converter for converting program code to object code; and a data representation implementor for isolating within the compiler information that relates to representation of data at runtime, wherein the converter accesses the data representation implementor to obtain information that is needed for converting any portion of the program code that is dependent on representation of data at runtime.

In another aspect of the invention, the data representation implementor comprises a separate object-model implementor (OMI) for each different object-model (i.e., manner of representing objects at runtime) supported by a compiler for an object-oriented programming language. Each OMI is a separate component containing all compiler code that is dependent on the object-model it supports (e.g., code for providing information about and transforming all program constructs whose implementation is dependent on the object-model). The implementations of different object-models are thus separated from one another and from the rest of the compiler.

In yet another aspect of the present invention, different object-models may be supported within one compilation by assigning each class declaration of the object-oriented programming language to a particular OMI, which is responsible for objects of that class.

In another aspect of the present invention, other components of the compiler may consult a corresponding OMI via an interface (set of methods) when information regarding the object representation is needed.

In yet another aspect of the present invention, the compiler supports the ability to implement new object-models, by simply writing new object-model implementors. This can be done by a third-party, without having to access the source code of the compiler (other than to the header files which are part of a public application program interface (API)).

Advantageously, by isolating the code within the compiler that is dependent upon the runtime data representation, the data representation may readily be modified without having to rewrite the entire compiler. The compiler can then include means for registering a new data representation implementor, and for specifying which data representation is to be used in a particular context (e.g., which object-model is to be used for which class declarations). In this manner, a single compilation can include multiple data representations.

These and other aspects, features and advantages of the present invention will be described and become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof. Preferably, the present invention is implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Furthermore, for purposes of illustration, the compiler architecture of the present invention will be described herein in relation to C++, which is a well-known O—O programming language. It is to be understood, however, that the present invention is applicable to other O—O and non-O—O programming languages. Given the teachings herein, one of ordinary skill in the related art will be able to contemplate these and similar implementations or configurations of the present invention.

Figure 1:
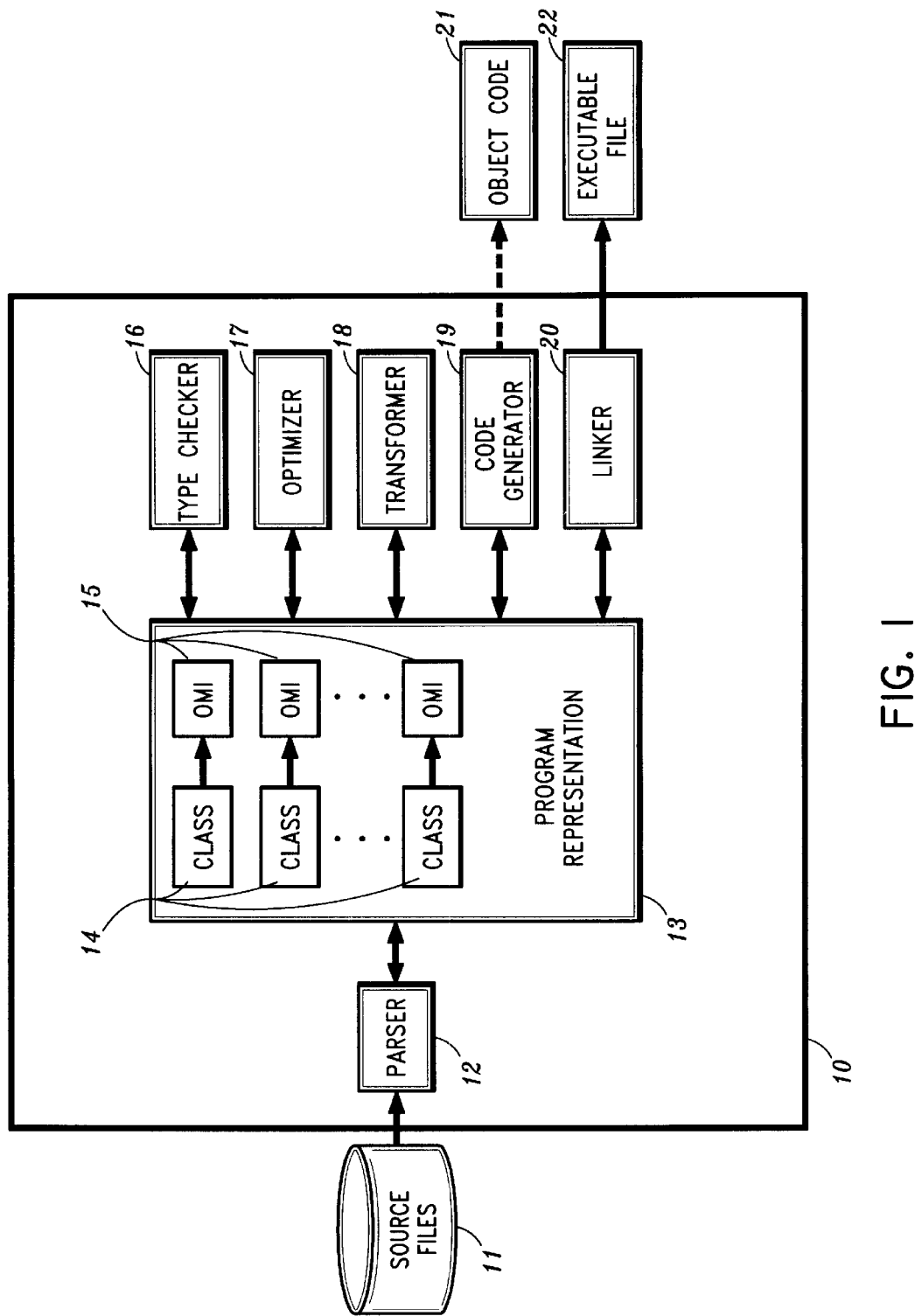
FIG. 1 is a block diagram of a compiler architecture for supporting multiple runtime data representations in accordance with a preferred embodiment of the present invention.

Referring now to FIG. 1, a block diagram illustrates a compiler architecture for supporting multiple runtime data representations in accordance with a preferred embodiment of the present invention. A compiler 10 receives source files 11 for processing. The source files 11 contain program code for a given programming language (e.g., C++ object-oriented program code). The source files 11 are processed by a parser 12 using methods known to those skilled in the art to determine the linguistic constructs in the source code and generate a parse tree representing the linguistic constructs. A program representation module 13 comprises, inter alia, a plurality of object-model implementors (OMI) 15, with each OMI preferably being assigned to a corresponding one of a plurality of class declarations 14. Each OMI 15 separately stores class-specific information for the corresponding class 14 and contains the code which is responsible for structuring objects of the corresponding class 14 at runtime. In this manner, different object representations can be used for objects of different classes, and a user may specify what the object-model should be for each class. It is to be understood that although the diagram of FIG. 1 shows each class being assigned to a particular OMI 15, multiple classes may refer to one OMI (i.e., one or more of the OMI modules 15 may be identical). A detailed discussion of a preferred OMI architecture will be discussed below with reference to FIG. 2.

The compiler 10 includes a transformer 18 which transforms the parse tree generated by the parser 12 into a parse tree of a lower level language. In particular, the transformer 18 transforms the non-object-oriented features of the C++ parse tree (generated by the parser 12) into corresponding C language features (which have the same meaning). For the object-oriented components of the C++ tree (e.g., object structure, method calls, object instance variable references), the transformer 18 calls the corresponding OMI 15, which then transforms the object-oriented components of the C++ parse tree into a C parse tree using code which is specific to the object representation supported by the OMI 15.

The compiler 10 also includes components such as a type checker module 16 which checks static semantics (e.g., ensuring that references to functions and variable are legal). An optimizer module 17 processes the parse tree to optimize the code for object code generation. A code generator module 19 generates object code 21 in accordance with the object-model representations mandated by the corresponding OMIs 15. A linker module 20 links the object code 21 to generate executable code 22. Each of the components of the compiler 10 described above can access (query) each one of the OMIs 15 to obtain object representation-specific information that is needed to assist in executing its respective functions.

It is to be understood that the compiler of FIG. 1 may be configured as an incremental compiler. An "incremental" compiler is one that, during the initial compilation, creates a representation of the source, and in subsequent compilations only reprocesses those parts of the source that have changed. Similarly, an object-model implementation in an incremental context would only reprocesses the parts of the source that have changed.

Figure 2:
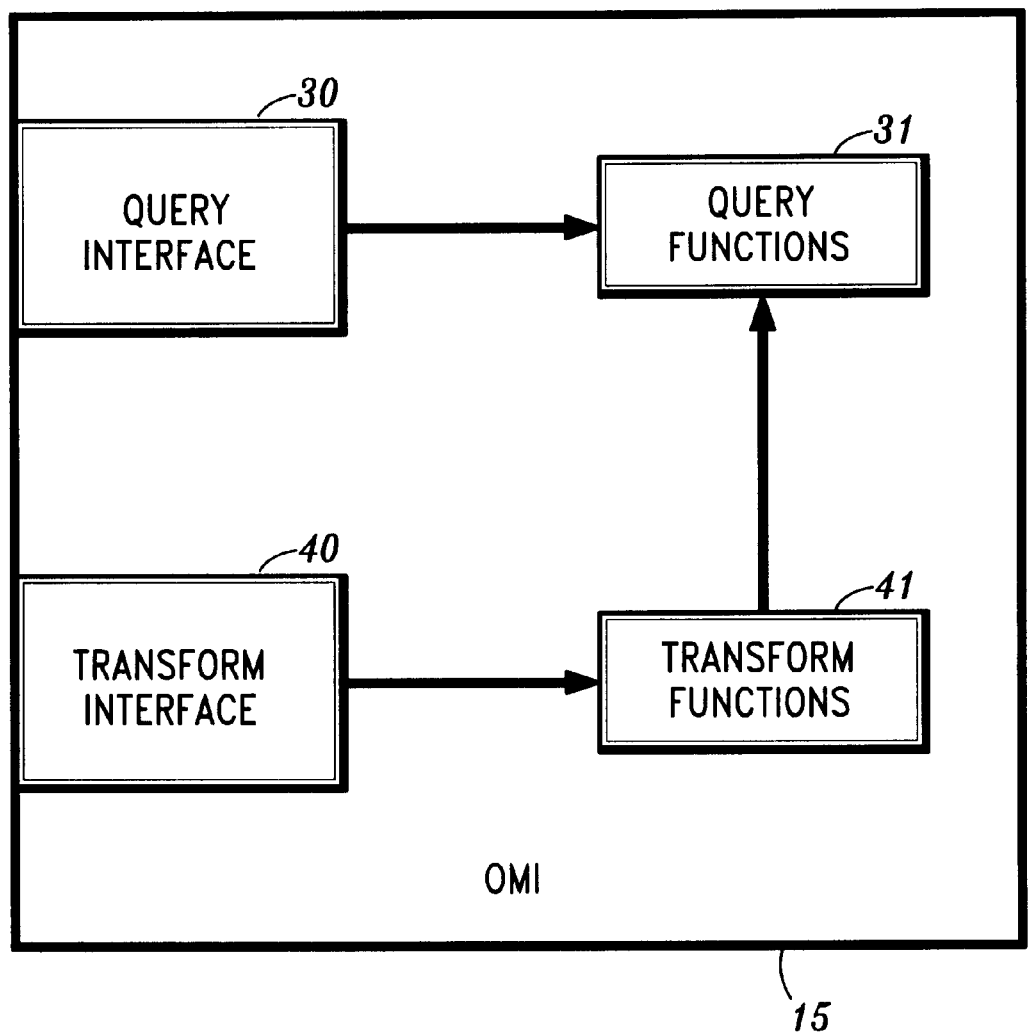
FIG. 2 is a block diagram illustrating a data representation implementor in accordance with a preferred embodiment of the present invention.

Referring now to FIG. 2, a diagram illustrates components of an OMI in accordance with a preferred embodiment of the present invention. As stated above, each OMI 15 comprises the code which is used to implement each object-model (the structure of the object at runtime). As shown, each OMI 15 comprises an interface comprising two parts: a query interface 30 and a transform interface 40. The query interface 30 represents that portion of the OMI interface by which the compiler (i.e. the components of the compiler) or other system components such as a debugger may obtain information about the class that depends on the underlying representation of objects supported by the object-model implementor. The query interface 30 of a given OMI 15 provides access to other components of the compiler for accessing one or more query functions 31 to obtain information about classes that depend on the underlying object representation supported by the OMI 15.

Various preferred query functions 31 which may be implemented within each OMI 15 will now be discussed. In the following discussion, the terms "ClassDeclarationInfo", "VariableDeclarationInfo" and "MemberDeclarationInfo" respectively refer to the internal representation within the compiler of all the information needed about a class, a variable and a class member. The preferred query functions include:

(1) StorageAlocationInfo getStorageAllocationInfo (ClassDeclarationInfo)—

Given class-specific information, "ClassDeclarationInfo," this query function 31 of an OMI 15 will return the information needed to allocate the storage for a new object. For example, with IBM's Visual Age C++ ™ v4.0, a large collection of object-models is supported with allocation information consisting of object size and alignment information (example: each instance of the class needs 55 bytes of storage which must be word aligned). But to support an even larger set of object-models with, e.g., objects stored in non-contiguous storage or storage unknown to the general run-time environment, different information would have to be returned. It is to be appreciated that for full generality and flexibility, "StorageAllocationInfo" may contain executable code blocks in lieu of, or in addition to, simple data.

(2) PointerInfo getPointerToDataMemberInfo (ClassDeclarationInfo)—

Given class-specific information, "ClassDeclarationInfo," this query function 31 of an OMI 15 will return information needed to store a pointer to a data member. This contains the size of the pointer and its required alignment.

(3) PointerInfo getPointerToMemberFunctionInfo (ClassDeclarationInfo)—

Given class-specific information, "ClassDeclarationInfo," this query function 31 of an OMI 15 will return information needed to store a pointer to member functions.

(4) VariableAccessInfo getVariableAccessInfo (ClassDeclarationInfo, VariableDeclarationInfo)—

Given class-specific information, "ClassDeclarationInfo," and a variable in the class, "VariableDeclarationInfo," this query function 31 of an OMI 15 will return information needed to retrieve or modify the data stored in that variable. For example, in IBM's Visual Age C++ 4.0 a large collection of object-models is supported with variable access information comprising the offset from the beginning of storage containing the object (plus a bit offset into that for bit-field variables). But to support an even larger set of object-models, different information would have to be returned. It is to be appreciated that for full generality and flexibility, "StorageAllocationInfo" may contain, for example, two blocks of executable code in lieu of, or in addition to, simple data, for the retrieval and modification processes.

(5) String getExternalSignature(MemberDeclarationInfo)—

Given information about a declaration of a member of a class, "MemberDeclarationInfo," this query function 31 of the OMI 15 will return the name of the declaration used by the system linker (i.e., the "mangled name"). In many systems, the linker uses different names than used by the programmer to describe the same thing. This is often used to implement procedure name overloading, for example.

(6) ExceptionInfo getExceptionInfo (ClassDeclarationInfo)—

When accessed, this query function returns the information about the class needed for exception handling. For example, as is understood by those skilled in the art, when exceptions are thrown at runtime, code is skipped until an appropriate handler is found. This handler might be in a different context than the code that caused the exception to be thrown. It might be necessary to upcast objects (i.e., treat them as instances of one of their base classes) to be appropriate in that different context. The ExceptionInfo returned by this query function includes the information needed by the compiler to generate code appropriately for these upcasts.

(7) DebugInfo getDebugInfo(ClassDeclarationInfo)—

When running a program in debug mode, additional runtime information, which depends heavily on the runtime object-model, is needed for use by the debugger. This query function returns such information.

(8) String getName( )—

This query function returns the name the object-model chooses to be known by in communications with a human.

(9) Boolean canInheritFrom(ClassDeclarationInfo)—

As is understood by those skilled in the art, some object-models permit inheritance from classes implemented by different object-models. A few object-models have a representation at runtime which will permit such mixed object-model inheritance. This query function permits the OMI to control this (part of the "ClassDeclarationInfo" is the OMI of that class).

It is to be understood that the illustrative query functions discussed above (which are described in terms of the C++ O—O programming language) are not exhaustive of the number of query functions 31 which may be implemented in the OMI 15. Those persons skilled in the art may envision other query functions that are suitable for use with a given O—O programming language, as well as a non-O—O programming language.

Referring again to FIG. 2, the OMI interface also includes a transform interface 40 which is the component for transforming program constructs which depend on the underlying representation of objects supported by the OMI 15. Each OMI 15 preferably has one transform function 41 for each of the language features supported by the OMI 15. In particular, in the preferred embodiment, the language features include the object-oriented C++ constructs which are transformed (via the corresponding transform function 41) into the corresponding C representation. Each of the transform functions takes the appropriate C++ program construct, and returns a program construct which no longer contains any of the object-oriented features. The transformed code can use extra fields created in the object by the OMI 15, and specific to that implementation (e.g. virtual function table pointers, virtual base pointers, etc.). It is to be appreciated that any necessary formatting, such as class mapping and virtual function table generation, are performed as needed by the code behind the query interface 30 and/or the transform interface 40. As necessary, the OMI 15 will add appropriate data-structures into the dictionary for the compiler 10.

In the preferred embodiment, the list of C++ language features which are transformed by the OMI 15 are as follows:

| Language Features | Examples |
|---|---|
| class member access: | a.b, a->b, a with implicit 'this' |
| cast to base/derived class pointer: | (B*) dp, (D*) bp |
| creating a pointer to member: | &A::x |
| pointer to member access: | a.*b, a->*b |

-continued

| Language Features | Examples |
| --- | --- |
| pointer to member cast: | (B::* int) pm, (int C::* (int, char))pmf |
| cast pm to boolean: | if (pm), (bool) pm, (bool) pmf |
| zero initializer: | int C::* pm = 0 |
| member function call: | a.f( ), a->f( ) [virtual and non-virtual] |
| member function body: | |
| constructor/destructor call: | |
| constructor/destructor body: | |
| return statement: | return p, (p is pointer/reference to class) |
| dynamic cast: | dynamic_cast<C*>(p) |
| typid of polymorphic class type: | typeid(p) |

As is understood by those skilled in the art, the implementation of the above listed C++ language features are specific to the object representation at runtime. As such, their transformation is performed by a desired OMI 15 using the appropriate transform function 41. It is to be appreciated that if certain object representation-specific information is needed during the transform process (via transform functions 41), such information may be obtained by directly accessing the appropriate query function 31. The transform functions 41 which are utilized for transforming the O—O program constructs into simpler constructs are known to those skilled in the art. However, the process of isolating the code associated with the transform functions 41 within the appropriate OMI 15 is one of the novel features of the present invention.

Advantageously, each OMI 15 isolates all details of the object-model for a given class 14 (i.e., the manner in which objects of the class are represented at runtime). The rest of the compiler 10 knows nothing about object representation, and always consults the OMI 15 through the query and transform interfaces 30 and 40. Therefore, the OMIs may be considered as "pluggable components" in the sense that a programmer can select, on a class-by-class basis, which OMI will be used by the compiler for a given class. In addition, the user may easily write and implement new object-models to represent objects in a new manner without having to analyze and rewrite the code comprising the compiler. The manner in which each OMI is written and incorporated in a given compiler is specific to the programming language which is used write the compiler. For O—O programming languages, this may be done by defining an interface (e.g., query and transform interface) for the OMI that all OMIs should satisfy. The defined interface is then coded as a base class, and a subclass is created which inherits from the base class and provides the actual implementations of the various methods (e.g., the transform functions and the query functions) of the interface. Each OMI 15 is thus implemented using the O—O programming feature "polymorphism" as is understood by those skilled in the art.

Figure 3A:
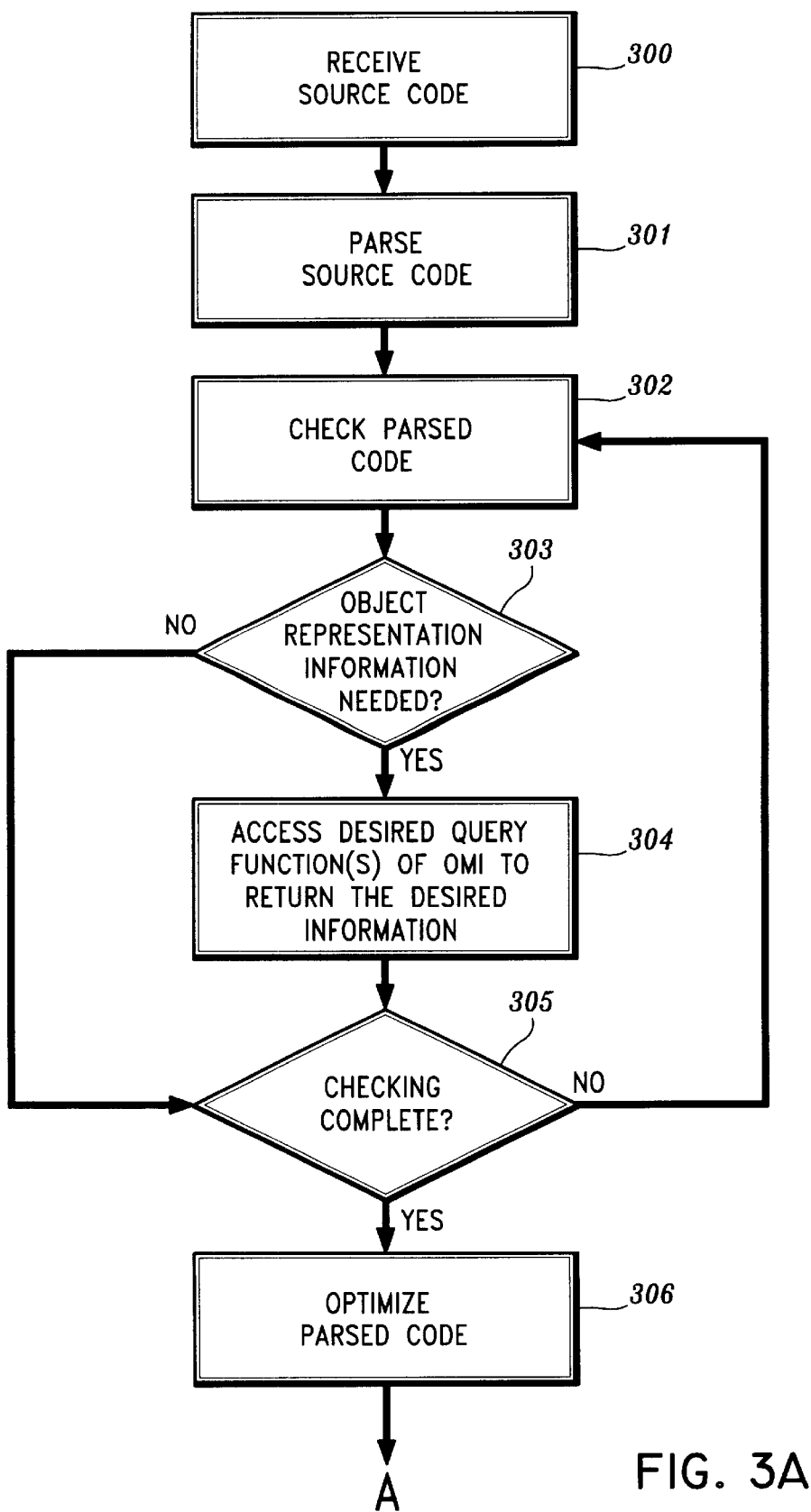
FIGS. 3a and 3b comprise a flow diagram of a compiling process which illustrates a method of operation of a compiler configured to support multiple runtime data representations in accordance with the preferred embodiment of FIG. 1.
Figure 3B:
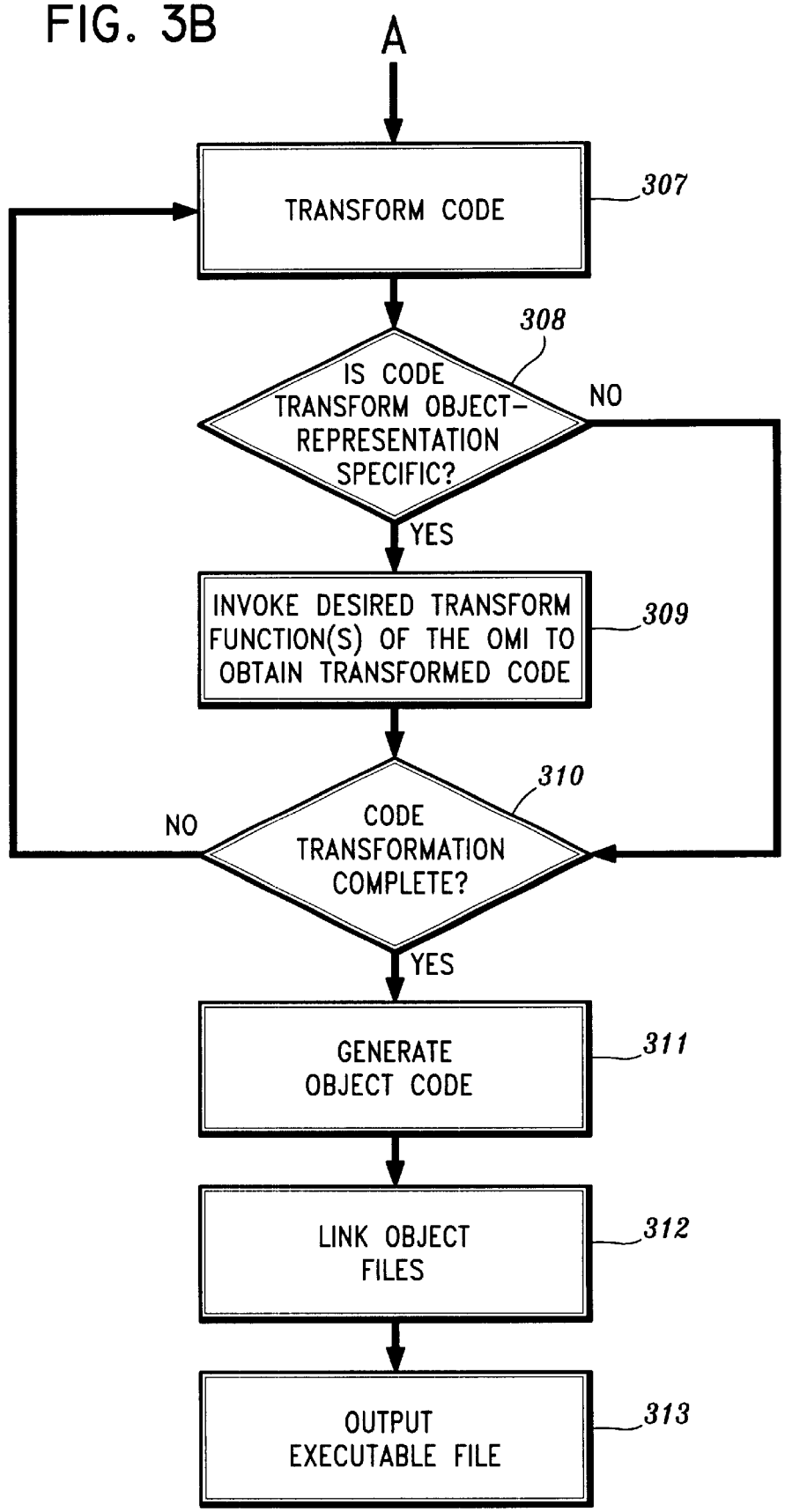

Referring now to FIG. 3a and 3b, a flow diagram illustrates a preferred method for compiling C++ source code in accordance with one aspect of the present invention, which illustrates, in general, an operation of the preferred compiler of FIG. 1. Initially, referring to FIG. 3a, the compiler will receive a block of source code (step 300) and parse the source code to determine the linguistic constructs in the source code and generate, e.g., a C++ parse tree (step 301). Then, a checking process is initiated (step 302), whereby the static semantics of the parsed C++ code is checked (step 302) using methods known to those skilled in the art. It is assumed that the parsed code is checked on a class-by-class basis. If, during the checking process, certain object representation-specific information is needed for checking a portion (class) of the C++ parse tree (affirmative determination in step 303), the appropriate query function of the OMI for the class will be accessed to return the desired information (step 304). One query that may be frequently accessed, for example, is the function that returns information regarding the size of the object. When the checking process is determined to be complete (affirmative determination in step 305), the parsed C++ code is optimized (step 306) using methods known to those skilled in the art.

When the optimization process is complete, referring now to FIG. 3b, the code transform process is initiated (step 307), whereby the parsed C++ code is transformed to C code (i.e., the C++ parse tree is converted to a C parse tree). For each of the C++ program constructs represented in the parse tree, a determination is made as to whether the transform for a given program construct is object representation-specific (step 308). If so, (affirmative determination in step 308), one or more required transform functions of the corresponding OMI (for the given class) will be invoked to obtain the transformed code (step 309), otherwise the code is transformed by the transformer 18 (FIG. 1) itself. As discussed above, if certain object representation-specific information is needed during the transform process, such information may be obtained by directly accessing the appropriate query function of the OMI.

When all the transform process is complete (e.g., when the C++ code has been transformed into its corresponding C representation) (affirmative determination in step 310), the compiler will generate object code (object files) to represent the transformed code (e.g. the C parse tree) (step 311). The object files are then linked (step 312) to generate an executable file which is output (step 313) for further processing (e.g., stored in memory for execution).

It is to be understood that the above-described process is solely for illustrative purposes and the steps may be different depending on programming language being compiled and the manner in which the compiler is programmed. For instance, during the parsing process (step 301) and/or the checking process (step 302), one or more query functions may be invoked, if necessary, to obtain certain object representation-specific information that is needed to perform such process.

Advantageously, an object-model implementor (OMI) can be written, compiled and implemented without access to the source code of the compiler (except for the published header files which are preferably part of a public API). In this regard, the OMI may be compiled into a dynamic link library (DLL) and an extension mechanism (such as the VAC++ extension mechanisms discussed in "Extension Mechanisms in Montana" by Danny Soroker, Michael Karasick, John Barton and David Streeter, Proceedings of the 8th Israel Conference on Computer Systems and Software Engineering, Herzliya, Israel, June 1997) can then be utilized to ensure that the DLL is loaded during compilation and is correctly initialized. During initialization, the DLL may be configured to register itself via a public interface. Part of this registration might involve specifying special classes that are to be associated with the OMI. Any derived classes all of whose base classes have the OMI will automatically be assigned to the same OMI. It is to be appreciated that the C++ programmer can also specify the desired object-model implementor for a specific class by name.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A compiler, comprising:
   a converter for converting program code to object code; and
   a data representation implementor for isolating within the compiler information that relates to representation of data at runtime, wherein the converter accesses the data representation implementor to obtain information that is needed for converting any portion of the program code that is dependent on representation of data at runtime.

2. The compiler of claim 1, wherein the data representation implementor comprises at least one query function which may be accessed by the converter for querying details of the representation of data and at least one transform function for transforming at least one program construct of the program code which depends on the representation of data at runtime.

3. The compiler of claim 1, wherein the data representation implementor comprises a plurality of different data representation implementors, each containing code for implementing a desired data representation.

4. The compiler of claim 3, wherein the data representation implementors are pluggable components.

5. The compiler of claim 3, wherein the compiler is configured such that the incorporation of additional data representation implementors within the compiler does not require modification of private source code of the compiler.

6. The compiler of claim 3, wherein each of the data representation implementors comprise at least one query function which may be accessed by the converter for querying details of its corresponding data representation and at least one transform function for transforming at least one program construct of the program code which depends on its corresponding data representation.

7. The compiler of claim 1, wherein the compiler is an incremental compiler.

8. The compiler of claim 6, wherein the program code is written in an object-oriented programming language and each data representation is an object-model which represents the format of objects at runtime.

9. The compiler of claim 8, wherein each class declaration of the program code is assigned to a particular one of the data representation implementors, each being responsible for implementing objects of its assigned class.

10. The compiler of claim 8, further comprising an interface, wherein the at least one query function and the at least one transform function of the data representation implementors are accessed by the converter through the interface.

11. The compiler of claim 10, wherein the interface is coded as a base class, and each of the data representation implementors are coded as a subclass of the base class.

12. A method of compiling source code by a compiler, comprising the steps of:
    converting the source code to object code; and
    accessing at least one data representation implementor of the compiler, which is responsible for implementing a corresponding data representation, if the converting step depends on the corresponding data representation, wherein the data representation implementor isolates compiler code for implementing the corresponding data representation.

13. The method of claim 12, wherein the accessing step includes the steps of:
    invoking one of at least one query function of the at least one data representation implementor to return information regarding details of the data representation, at least one transform function of the data representation implementor to transform any program construct of the source code that depends on the data representation, and a combination thereof.

14. The method of claim 12, wherein the source code is written in an object-oriented program and the at least one data representation implementor implements a corresponding object-model, the object-model representing the format of objects at runtime.

15. The method of claim 14, further including the step of assigning each class declaration in the source code to at least one of a plurality of data representation implementors, wherein the step of accessing the at least one data representation implementor of the compiler includes accessing the one of the plurality of data representation implementors that is associated with a desired class.

16. A program storage device readable by a machine, tangibly embodying a program of instructions executable by the machine to perform method steps for compiling a source file by a compiler, the method steps comprising:
    converting the source code to object code; and
    accessing at least one data representation implementor of the compiler, which is responsible for implementing a corresponding data representation, if the converting step depends on the corresponding data representation, wherein the data representation implementor isolates compiler code for implementing the corresponding data representation.

17. The program storage device of claim 16, wherein the instructions for performing the accessing step include instructions for performing the steps of:
    invoking one of at least one query function of the at least one data representation implementor to return information regarding details of the data representation, at least one transform function of the data representation implementor to transform any program construct of the source code that depends on the data representation, and a combination thereof.

18. The program storage device of 16, wherein the source code is written in an object-oriented program and the at least one data representation implementor implements a corresponding object-model, the object-model representing the format of objects at runtime.

19. The program storage device of claim 18, further including instructions for assigning each class declaration of the source code to at least one of a plurality of data representation implementors, wherein the instructions for the step of accessing the at least one data representation implementor of the compiler include instructions for accessing the one of the plurality of data representation implementors that is associated with a desired class.

* * * * *